April 18, 1967  C. A. REAMS  3,314,483
HELICOPTER WINGED DEVICE
Filed July 26, 1965  2 Sheets-Sheet 1

INVENTOR.
CLINTON A. REAMS

April 18, 1967 C. A. REAMS 3,314,483
HELICOPTER WINGED DEVICE
Filed July 26, 1965 2 Sheets-Sheet 2

INVENTOR
CLINTON A. REAMS

United States Patent Office 3,314,483
Patented Apr. 18, 1967

3,314,483
HELICOPTER WINGED DEVICE
Clinton August Reams, Dearborn, Mich.
(P.O. Box 7734, Washington, D.C. 20004)
Filed July 26, 1965, Ser. No. 474,923
3 Claims. (Cl. 170—166)

This is a continuation-in-part application of my application Ser. No. 287,546 filed June 16, 1963, entitled, Helicopter Winged Device, now abandoned.

This invention relates to a new helicopter winged device particularly to the more rapid transport by fixed wing aircraft in conjunction with my device of personnel and critical items to terral sites where there are no landing facilities for aircraft to make delivery, to distressed areas, and to the military in field operations and for similar uses.

Part I.—Launching means

There exists a need to provide means for the delivery of men and materials to spots where a military rendezvous is contemplated or where a large construction project can be best served by fast on-the-spot delivery required in terrain where there is no landing field in the usual inaccessible locations. Heretofore, this has not been possible to do because of the hazard and likely loss of critical items such as medical supplies, food for a disaster area, ammunition for military, military personnel, food items subject to spoilage, special mail items, etc. Utilizing my helicopter winged device in conjunction with a high speed fixed wing aircraft equipped with a launching tube means for same is this element of my invention; hence, it is possible to provide this heretofore non-existent service by use of heavy air transport planes as well.

The inventor has sought to provide a more practical drop means in this amended application without possibility of an air lock in the launch tube that might lead to disastrous consequences. Eliminated is the free-drop to start the turbine engine, it being safer practice to start the turbine engine in order to have the rotor system of my device functioning well before the drop is made to also assure the operative function of the rudder on my helicopter winged device so that direction is assured at the time of release from the downpending launching tube, particularly when it is desired to tow one or two helicopter wing devices from the fixed wing aircraft after launching preparatory to drop.

There exist several applications of my device for load carrying; in all instances the load is carried below the vertical shaft mounted rotatable rotor system along with the turbine engine integrally mounted in the cargo carrying or personnel carrying body pan-shaped as hereafter described. It is further anticipated that other forms may be adopted, in each instance keeping the center of gravity below the rotor system to preserve stability in flight.

Having set forth the pertinent facts relative to this element of my invention, it consists of the arrangement embodied in this part in relation to the general application and construction. In describing the drawings of the launch method and means from a fixed wing aircraft and the related parts:

In referring to the drawings as herein set forth, like reference characters indicate like parts for ease in identification.

Figure 1:
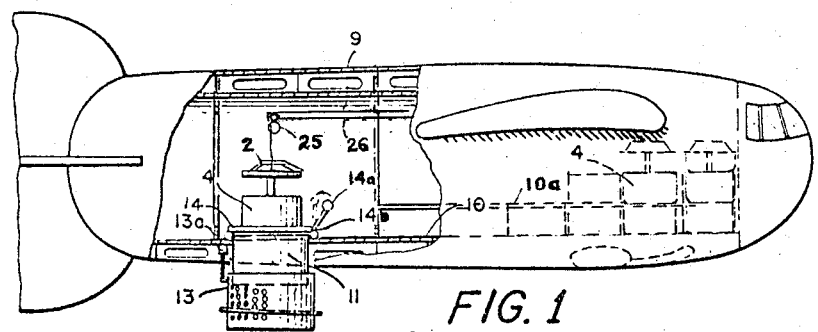
FIGURE 1 represents a longitudinal section of a high speed fixed wing cargo carrying airplane that serves to illustrate the application of my helicopter winged device with relation to the launching operation through its appended launching tube and incorporating a side view of it in down position for launch.
Figure 7:
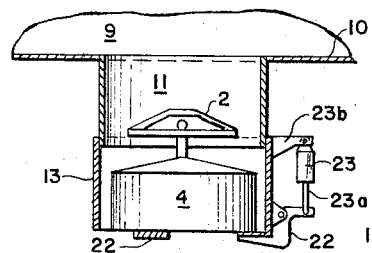
FIGURE 7 shows a side sectional view of launching tube to illustrate how the helicopter winged device is lowered from rest-position "ready," in FIGURE 2 above, with hoist on the axial center of launching tube with trolley monorail above with attached hook to engage lifting eye of the rotor system, integral with hub attached to vertical axial shaft of the helicopter winged device.

FIGURE 1 shows the arrangement for the stowage of the helicopter wing devices on the floor 10 of the fixed wing aircraft 9 and on tiered racks 10a along the side of its fuselage 9a, arranged on same and removable by means of monorail hoist 25 running on monorail 26 and supported by trolley 25a with hook 25b shown in detail in FIGURE 7. Besides the handling feature on board of the aircraft, the launching tube mounted in the center of the floor aft of the fuselage 9a is the hatch ring secured to the floor 10 and the space around the periphery in which is nested the outer hatch ring 13 when in flight. This serves as deflector of high velocity air currents along the outer surface of the aircraft 9, the holes 13b dissipating the pressure build up in the hatch 13 opening when in flight at time of launch of the helicopter winged device 2 with its appended cargo carrying pod attached to vertical axial shaft 1. At floor level around hatch 11 is steady frame 14 with valve 14a and actuator 14b thereon.

Figures 2, 3, 4:
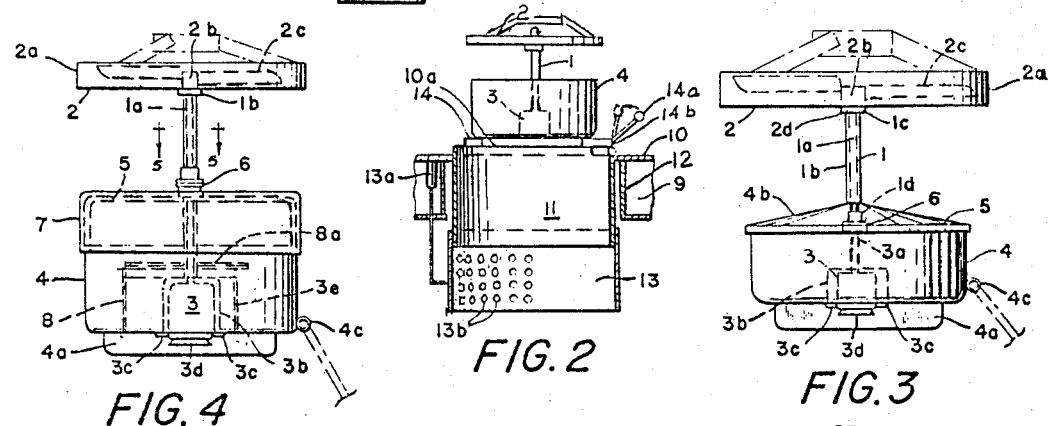
FIGURE 2 represents a side elevation of my helicopter winged device held in position of "ready" and above the launching tube before lowering.
FIGURE 3 represents a cargo carrying application of my helicopter winged device side view.
FIGURE 4 shows a side view of my helicopter winged device with parts necessary to accommodate the carrying of personnel.
Figure 6:
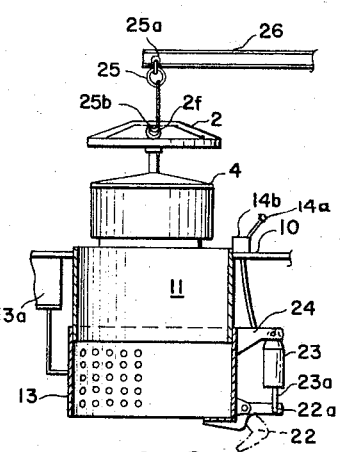
FIGURE 6 shows a cutaway sectional view of the launching tube, the upper wing of same downpending and outer hatch element in down position with the operating parts thereto supporting the helicopter winged device before lowering for final lanuch is made.

FIGURE 2 shows an enlarged sectional view of the hatches 11 and 13 downpending with the helicopter winged device 2 at "ready" position to lower (lift truck 14 omitted as hazardous to personnel) with the valve 14a and release mechanism integral at floor 10 level, ready for lowering as in FIGURE 6.

Figure 10:
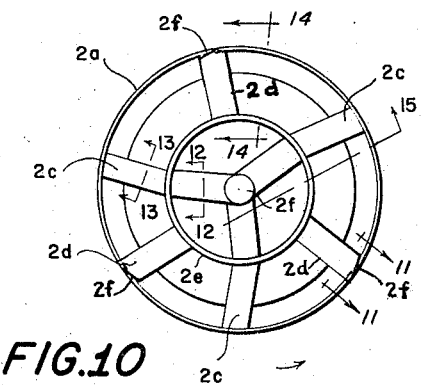

FIGURE 3 shows a side view of the helicopter winged device in the original form on which my invention was predicated with the primary integral parts: bladed rotor 2 with blades 2c radiating from hub 2b with peripheral shroud ring 2a. In FIGURE 10, secondary blades 2d are supported by inner ring 2e to form a secondary wing, the primary and secondary blades providing a rotor system to better sustain flight.

FIGURE 4 is a side view of my device as a personnel cargo carrying pod 4 attached to the rotor system 2, hub 2b attached with cover 1a, thrust bearing 6 is above clear round plastic dome 7 and supported by arbor 5 framed beneath, as protection against weather. Seating is cluster-arranged over the turbine engine 3, enclosure 3a in seats 8 and 8a, dividers 8b around cover 3b. The ring 4e is for retrieval line attachment, 3e indicates controls for the device in flight.

Figure 5:
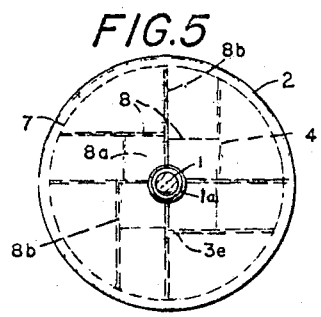
FIGURE 5 shows a plan view of the cargo carrying pan-shaped pod and cluster seating of personnel and their gear.

FIGURE 5 is a plan view of the cargo personnel carrying pod 4 with seating and dividers and parts as in FIGURE 4 above.

FIGURE 6 shows a cutaway sectional view to illustrate how the cargo carrying pod 4 of the helicopter wing of device 2 is lowered from position "ready," in FIGURE 2 above, by means of hoist 25 from trolly 25a with hook 25b by means of lift eye 2f integral with the rotor hub 2b and with the cargo carrying pod 4 both connected by the vertical axial shaft 1 rotatable.

FIGURE 7 shows a side sectional view of the launching tube upper ring 11 inside the outer collapsible ring hatch 13 indicated in down position. The cargo-carrying pod of the device rests upon the lower lugs 22 actuated by hydraulic cylinders 23 pivoted upon pins 22a on brackets 24 and attached to hatch 13 at 120° center. To launch, the actuated hydraulic valve 14b causes the lugs to travel in arcuate path back to a position suitable to support another device for launching from the launching tube 13.

Figure 8:
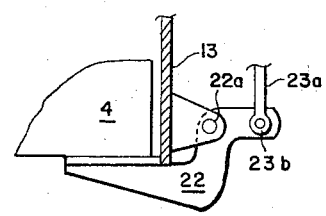
FIGURE 8 illustrates the enlarged portion in a sectional view of the lower part of the launching tube and the integral parts fitted to same to provide preferred means to launch the helicopter winged device.

FIGURE 8 shows an enlarged part sectional view of the lower part of launching tube 13 of which it is shown with lugs 22 to support the cargo carrying pod 4 with pistons 23a and pins 23b connected to hydraulic valves 14b and pins 22a pivots for lower lugs 22.

*Part II.—Helicopter winged device, drop pod element*

In Part I of this amended application, description has been made of this principal element of my invention, the helicopter wing device adapted to be dropped from a fixed wing aircraft in flight. This drop pod element is composed of several parts: a rotor system to sustain flight to location after the drop is made and after landing to return to base. Mounted on a vertical rotatable shaft and axis of which is the center for the coupling, the round pan-shaped cargo carrier has in its bottom integrally mounted a turbine engine between two parallel rudder-like rest-members upon which the helicopter wing device can land—or sit on a level surface, where it is not possible to land fixed wing aircraft.

This device can be adapted to the transport of supplies, food and many critical items for the use of the military for a protective cover is provided over the otherwise open top. Personnel, four shown, can be protected over the top of the cargo carrying pod by means of a plastic bubble canopy and seats to fit in cluster arrangement. Small in size, these small helicopter winged devices dropped in groups, or sent in "waves," would provide an element of surprise in attack or in making secure a position by the military in foreign compaigns. American Red Cross considered this to be of value in disaster relief. The Post Office Department can make mail drops between principal cities with this device. Interior Department can fight forest fires with this device.

In the delivery and spotting of these helicopter wing devices to locations on the terrain, it is anticipated that a plotting method can be provided by radar or similar means and their return by a homing method provided by the military. Also, after the helicopter winged device is drop launched from the fixed wing aircraft, as previously described, it is possible to affix a tow-line to the metal fitting provided on the metal cargo carrier body, same not to be towed by means of a taut line from the aircraft. By this method, it is possible to bring by towing one or several helicopter winged devices at or over a ground site without releasing if the conditions are unfavorable for landing. By this means it is possible to sow certain devices where such application is found to be desirable and field conditions favorable.

The original application of the rotor system of my device did not insure autorotative couple about the vertical axis of the helicopter rotors wing system and freedom from pitching in flight. The single blading system shown in the elevations FIGURES 3 and 4 of the original application with plan view FIGURE 7 did not insure that the contrarotation might not zero out the kinetic effect of the air mass as the rotor was revolving to render the wing system inefficient in flight. The stagger located outer positioned angular blades insure a stable condition for the helicopter winged device while in flight or at launch, also in towed condition. Tipping over 10° in the horizontal plane beyond the incident angle in flight will not affect the stability of the helicopter rotor wing system. Raising the inside root of the secondary blades angularly positioned and connected to the upper ring on the vertical axis of the blade system provides a longer blade with its outer terminus and fixed connection to the outer shroud set at an angle of 12° with the horizontal of the lower primary blades that turn about the vertical axis of the rotor system, there being little chance of pitching in flight with this arrangement.

Along with the increased stability factor, more air is pushed down from above by the upper rotating secondary blades to lessen the light-flight characteristic of the primary blading of the rotor system by creating a turbulent condition in the space between the secondary and primary blading to disturb the combined flow pattern. It is known that boundary layer flow is susceptible to disturbances of the various frequencies such as will be present.

The purpose is primarily to provide kinetic energy to move the air mass to sustain flight utilizing a new pattern concept of air flow where the dissipate strata of air at the raised tip of the right hand twist secondary blades is disposed above the shroud as ionized atmosphere caused by the high tip speed at the outer periphery. Herein, is a balancing of the components of secondary air currents from viscous drag for the ionized particles of the atmosphere, as changed, are readmitted at the outer periphery of the rotor ring into the outer portion of the primary blading system from below and moving upward, mix with the downwash air from the inner blade section of the primary blades when rotating at speed. This mixing serves to increase lift on the underside of the secondary blades and makes sustained flight with a high lift coefficient possible. Thus, the primary blades at their inner radius move admixed ionized air-atmosphere to lessen the formation of eddies in the wake of the cargo carrying pod of the helicopter wing device to thereby reduce resistance of air, headwinds, gale or squall that might affect the flight path. This insures keeping on course and also the functioning of the turbine engine exhaust stabilization device made integral with the cargo carrying pod. Further, it is probable that the slight eddies produced in flight could not be spotted for the rapid decay of pattern therefrom would defy detection. This feature enhances its service for military use.

Another design refinement incorporated is the flaring of the inner crown-ring at the bottom where it is supporting the secondary blades at their inner termini so that the air speed from above is not increased as it would be if it were a venturi. It is so formed that it will not cause wake development as it would if from a shear zone should the ring shape be vertical or squared at the lower edge. These quasi-stable eddies would generate a flow disturbance at the near lead-edge of the secondary blades, considered undesirable in controlled flow pattern at that point.

It should be noted that the distance connoted on the raised tip portion of the secondary blades above the outer shroud (ring) as "x dimension" is a variable based upon the rotor diameter and its peripheral speed. A larger diameter would rotate at a slower speed and the "x dimension" hence should be smaller.

Translational flight in my device is accomplished by the improved rotor system in combination with the turbine engine exhaust into the cone and orifice ring that induces an air current stream between the toed-in channels on the bottom of the cargo-carrying pan-shaped pod in shape to produce a modified jet stream effect to give the device direction as well. Modification of the speed of the rotor system can also cause the helicopter wing device to change direction and/or course to insure better directional control by correction in this manner.

Further, my invention consists of the arrangement embodied in drawings each applicable to the uses in relation to application and construction.

Figure 9:
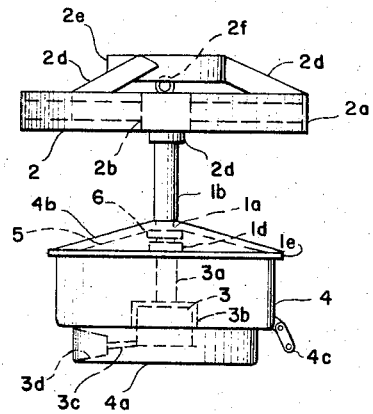

In describing these drawings of the rotor system and the construction of my device and its other integral parts:

FIGURE 9 represents the side elevation assembly of a preferred form of my device that serves to illustrate the helicopter wing device and their arrangement; parts of the rotor system, the rotatable vertical axis shaft to support and drive the device in flight, shaft coupling, cargo carrying pan shaped pod, rudder seat and exhaust arrangement from the turbine engine located in pod bottom recess.

FIGURE 10 represents a typical plan view of the improved rotor system with secondary blading.

Figure 11:
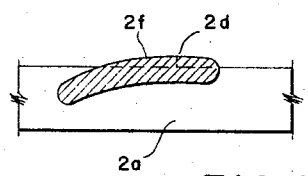

FIGURE 11 represents a cross-section of the typical secondary blade where it is attached to the peripheral shroud ring of the rotor system, taken in vertical plane at 11—11 on FIGURE 10.

Figure 12:
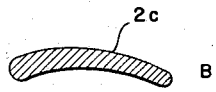

FIGURE 12 shows a vertical cross-section of the inboard portion of the typical primary blade of the rotor system assembly. See 12—12, FIGURE 10.

Figure 13:
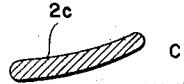

FIGURE 13 shows a vertical cross-section of the outboard portion of the typical primary blade of the rotor system assembly. See 13—13, FIGURE 10.

Figure 14:
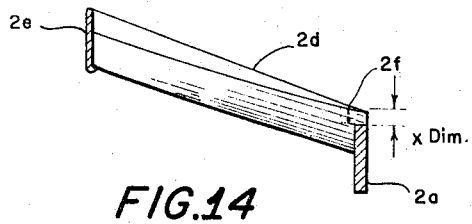

FIGURE 14 shows a combined cross-section of the inner crown ring of the rotor supporting the upper ends of the secondary stub-blades and the outer peripheral shroud ring and an elevation of the secondary warped looking in the direction of rotation with end slot at blade tip.

Figure 15:
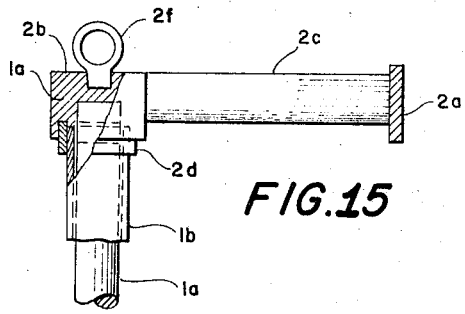

FIGURE 15 illustrates a section and part section cutaway, the construction and assembly of the rotor and its connection to the vertical drive shaft with blades of the primary and lift ring to raise and lower device upon the launching or drop from the fixed wing aircraft.

Figure 16:
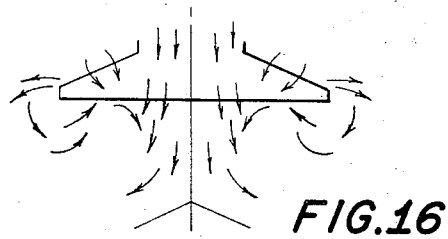

FIGURE 16 illustrates the multi-direction of the air paths when the rotor system is in flight increasing lift efficiency when at full speed, over that of a primary bladed (or vaned) elements in my device by having added the upper secondary bladed elements that increase movement of air mass with ionized atmosphere admixed in conjunction the lower bladed elements so translated into increased lift hereinbefore described.

In referring to the drawings of the individual types, this group of types is typical of those contemplated for use as in FIGURES 2, 3, 4 and 5 of Part I hereinbefore described. The like reference characters indicate like parts for ease in identification of the components in my helicopter wing device.

Where the rotor hub $2b$ of the rotor system 2 is affixed to the top of the vertical rotor shaft $1a$, a downpending circular metal collar $2d$ fits over the outer sleeve $1b$ on the axis of the rotor shaft $1a$ so supported to fit over cover $4b$ of the cargo carrying pod 4. This arrangement is to give weather protection in flight and as a safety guard over a rotating shaft $1a$. In turn, the cover $4b$ is supported by arbor 5, inside flanged metal frame element $1e$ secured under the cover $4b$ to the periphery of top edge of cargo carrying pod 4. Secured to the center of arbor 5 is the steady-bearing 6, fitted to shaft $1a$.

Below the cover $4b$ and attached to vertical rotor shaft $1a$ is torque slip-coupling $1d$. At starting of the turbine engine 3, this coupling $1d$ absorbs the instant torque and shear effect upon parts due to the high speed starting, insuring the steady pick up in speed of the rotor system 2. A like condition may be evident when the helicopter wing device is started from flight.

Referring to FIGURE 11 and FIGURE 14: When the rotor system 2 with primary blades $2c$ radiating from hub $1a$ and rotated by shaft $1a$ rotate connected to turbine motor 3, the secondary blades $2d$ are brought up to speed, the latter are supported at the inner radius by top ring $2e$ and at the outer end by the peripheral ring $2a$ where a slot $2f$ is made in the blade tip. By this means ionization of the air takes place and upon mixing is translated into lift as shown in the diagram shown in FIGURE 16 of the drawing, the outer dissipate ionized atmosphere is induced downwardly after passing from the secondary blade $2d$, tip slots $2f$ over the outer peripheral ring $2a$ up over outer portion of primary blades $2c$ and thence mixing with downwardly massive air movement through the center section of the blades $2c$.

On the bottom of the cargo carrying pod 4 and in recess $3b$ is secured the turbine engine 3. On the horizontal center line of the cargo carrying pod 4 and beneath are fixed two parallel flange metal channels as hereinbefore described. Located and positioned on the bottom and on a common center is turbine exhaust pipe $3c$ attached to a flared metal exhaust cone $3d$, between the toed-in flanged channels $4a$, the function of which has been described in maintaining directional control during flight.

Without this slip coupling $1d$, should the turbine engine 3 cease to function and the rotor system go into contra-rotation, the body known as the cargo carrying pod 4 would spin in the direction of rotation of the rotor system. During flight, this could prove disastrous for the cargo in the preloaded cargo pod 4 would most surely be displaced and scattered by the result of the centrifugal forces in spin. Falk Corporation and several reliable manufacturers make a reliable rugged coupling for this application in my device.

With the improved rotor system 2 as hereinbefore described, it is possible to rate the ratio of H.P. to loading at 40 lbs. per H.P. of the turbine engine 3 rating. The GTP 30–50 turbine engine rating at 8,000 r.p.m. as manufactured by Air Research (Garrett) will require an integral 4:1 reduction and the Continental Motor turbine engine no reduction to rotate the rotor system at 2,000 r.p.m. The rotor system O.D. is 6.4 ft. assumed based upon blade loading.

Assume gross capacity of system

| | Lbs. |
|---|---|
| 50 H.P.×40 lbs. | 2,000 |
| Deadweight | 440 |
| Net capacity of unit | 1,560 |
| Design capacity, assume 85% in sustained flight | 1,326 |
| Allowance over tare wt. | 234 |
| Allowance over tare wt., percent | 11 |

Where heavier loads are contemplated for the cargo pod 4, the outer sleeve $1b$ can be made from heavier metal and be supported upon the heavier flanged metal 3-leg arbor 5 attached securely to the metal frame element $1e$.

Having described this separate element of my helicopter winged device—the stowage and launching in a fixed wing aircraft arranged therefor, its use and application,

I claim:

1. A helicopter rotor comprising a drive shaft, a hub mounted on the shaft, a plurality of blades extending radially outwardly from said hub and including inner and outer sections, an outer peripheral rim attached to the outer tips of the outer blade sections, a plurality of sloped blades attached to said rim between the outer tips of the outer blade sections and extending inwardly and upwardly, an inner ring attached to the inner ends of said sloped blades and lying above and spaced from the first named blades, said inner ring being located substantially midway between said hub and the outer rim.

2. A helicopter rotor as in claim 1 wherein the inner blade sections have substantially flat pitch, the outer blade sections have negative pitch, and the sloped blades have a warped configuration.

3. A helicopter rotor as in claim 1 wherein the sloped blades have a tapered slot in the leading edge adjacent to the outer rim.

(References on following page)

References Cited by the Examiner

UNITED STATES PATENTS

| | | | |
|---|---|---|---|
| 984,812 | 2/1911 | Hearst | 170—168 |
| 1,986,151 | 1/1935 | Johnston | 170—166 |
| 2,030,993 | 2/1936 | Langenkamp et al. | 170—168 |
| 2,411,271 | 11/1946 | Jackson | 170—168 |
| 2,426,742 | 9/1947 | Pawlowski | 170—168 |
| 2,728,537 | 12/1955 | Elkins | 244—17.11 X |
| 2,843,337 | 7/1958 | Bennett | 244—2 |
| 2,903,076 | 9/1959 | Johannesen | 170—168 |
| 2,921,756 | 1/1960 | Borden et al. | 244—2 |
| 3,051,250 | 8/1962 | Jones | 170—168 |
| 3,065,933 | 11/1962 | Williams | 170—159 X |

MARTIN P. SCHWADRON, *Primary Examiner.*

MILTON BUCHLER, *Examiner.*

T. MAJOR, E. A. POWELL, Jr., *Assistant Examiners.*